United States Patent [19]

Beyme

[11] Patent Number: 5,646,874
[45] Date of Patent: Jul. 8, 1997

[54] MULTIPLICATION/MULTIPLICATION-ACCUMULATION METHOD AND COMPUTING DEVICE

[75] Inventor: Steffen Beyme, Munich, Germany

[73] Assignee: VLSI Technology, Inc., San Jose, Calif.

[21] Appl. No.: 363,064

[22] Filed: Dec. 21, 1994

[51] Int. Cl.⁶ .................................. G06F 7/38; G06F 7/52
[52] U.S. Cl. ............................ 364/736.02; 364/760.01
[58] Field of Search .................................. 364/736, 760

*Primary Examiner*—Tan V. Mai
*Attorney, Agent, or Firm*—Burns, Doane, Swecker & Mathis, LLP

[57] ABSTRACT

A method and a computing device for the multiplication/multiplication-accumulation of signed numbers, respectively of N bits and N–1 bits, generated a subword of N bits selectable from the result of 2N–1 bits using a multiplier/multiplier-accumulator incorporating a register file connected to an arithmetic and logic unit by a first bus and a second bus via a barrel shifter. The output of the arithmetic and logic unit is connected to the register by a third bus. A Booth Finite State Machine (FSM) is connected to the first bus. A partial product is realigned with respect to an operand A and an Arithmetical Shift Right (ASR) according to the following relation: product=ASR (product, align) ±operand_A. The cycles of a second type ar repeated until the partial product has been shifted by a number of bits corresponding to the desired subword position. Cycles of a first type are performed, such as to obtain, with respect to a Logical Shift Left (LSL), the relation: product=product±LSL (operand_A, align). The alignment quantity and the arithmetic operation are determined by the control FSM according to the Booth decoding of an operand B.

6 Claims, 1 Drawing Sheet

MULTIPLICATION/MULTIPLICATION-ACCUMULATION METHOD AND COMPUTING DEVICE

DESCRIPTION

1. Technical Field

The present invention relates to a multiplication/multiplication-accumulation method and computing device, generating a selectable subword of the result permitting both rounding by truncation and rounding to the nearest integer.

2. Prior Art

A prior art document ("ARM60 Data sheet", VLSI Technology inc., April 1992) describes a multiplier/multiplier-accumulator (MAC).

Given the datapath structure and the control flow, as described in this document and represented on FIG. 1, it is possible to perform integer multiplication/multiplication-accumulation of N-bit operands, yielding the least significant N bits of the product in a maximum of N/2+1 datapath cycles (may be less due to data dependent early termination mechanism).

Considering fractional arithmetic, as often found in floating point or DSP-type methods, the problem of multiplying two N-bit fractional numbers is equivalent to extracting a certain subword of the potentially 2N-bit product. Optionally, this subword needs to be rounded to nearest integer, while extracting a subword is in fact rounding by truncation. It is desired to spend the minimum possible time and hardware resources.

Clearly, if one needs to generate an arbitrary N-bit subword of the 2N-bit product by the given method, the problem must be reduced to four separate N/2×N/2-bit multiplications, then combining the partial results to get the full 2N-bit product, from which the desired subword can be extracted. This method takes a maximum of N+4 datapath cycles yet for the multiply operations, not taken into account the overhead for pre-aligning operands, combining the partial results and optional alignment and rounding operations of the product subword. Also, a number of registers for temporary result storage have to be occupied.

An object of this invention is to overcome these limitations. In particular, the datapath structure as the performance limiting factor of a RISC (Reduced Instruction Set Computer) approach should not be touched at all. Instead, the only innovations allowed are in the control flow. The control flow is to be implemented by a finite state machine (FSM).

PROCESS OF THE INVENTION

The present invention proposes a method and a computing device for the multiplication/multiplication-accumulation of signed numbers respectively of N bits and N−1 bits, generating a subword of N bits selectable from the result of 2N−1 bits, using a multiplier/multiplier-accumulator comprising a register file connected to an arithmetic and logic unit (ALU) by means of a first bus (A-bus) and a second bus (B-bus) via a barrel shifter. Said arithmetic and logic unit has its output connected to said register by means of a third bus (R-bus). A booth FSM is connected to the first bus. A partial product is realigned with respect to an operand A in accordance with the following relation:

$$\text{product}:=ASR \text{ (product, align)} \pm \text{operand}\_A$$

in which ASR is an arithmetic alignment to the right, i.e. with sign extension. Said cycles of a second type are repeated until the partial product has been shifted by a number of bits corresponding to the desired subword position. Cycles of a first type are performed, so as to obtain the relation $$\text{product}:=\text{product} \pm LSL \text{ (operand}\_A, \text{align)},$$

in which LSL signifies Logical Shift Left. The alignment quantity and the arithmetic operation are determined by the control FSM in accordance with the Booth decoding of an operand B. The operand A is advantageously limited to a signed N−1 bit word.

In an advantageous embodiment of the invention, there is a supplementary cycle of a third type for including a rounding bit, which is updated at each second type cycle by means of the ASR operation whilst retaining the final dropping out bit of the barrel shifter, a third cycle type defined by the following relation $$\text{product}:=ASR \text{ (product, align)}+\text{operand}\_C+\text{rounding}$$

concluding the sequence of cycles of the second type in order to bring the partial product to its final position.

Thus, the invention has the following characteristics:

multiplication of N-bit with (N−1)-bit signed numbers; direct generation of a selectable N-bit subword of the potentially (2N−1)-bit product. While this is equivalent to rounding by truncation, the new multiplier is able to round the N-bit subword to nearest integer as an option. If the subword is the least significant N bits of the product, the multiplier behaves exactly like the cited document;

generic 2-bit Booth algorithm with datapath structure given by the cited document;

optionally, an N-bit number of the same format as the product subword may be added, while not requiring further datapath cycles;

maximum N/2+2 datapath cycles to terminate, using early termination mechanism;

support both rounding by truncation and rounding to nearest integer.

Using a datapath as described in the citation, the invention makes it possible to implement an average speed multiplier (MAC(N/2+2 cycles) which supports a DSP/fractional arithmetic at the machine, by adding the control flow and the proposed data flow, so as to obtain two different rounding types, namely a rounding by truncation and a rounding to the nearest integer.

DETAILED DESCRIPTION OF EMBODIMENTS

Figure 1:
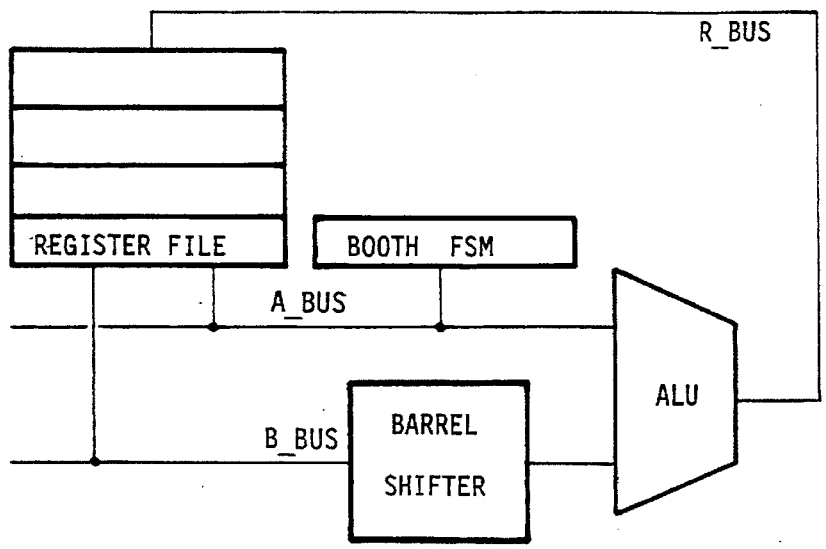
FIG. 1 shows a datapath structure as described in the citation.
Figure 2:
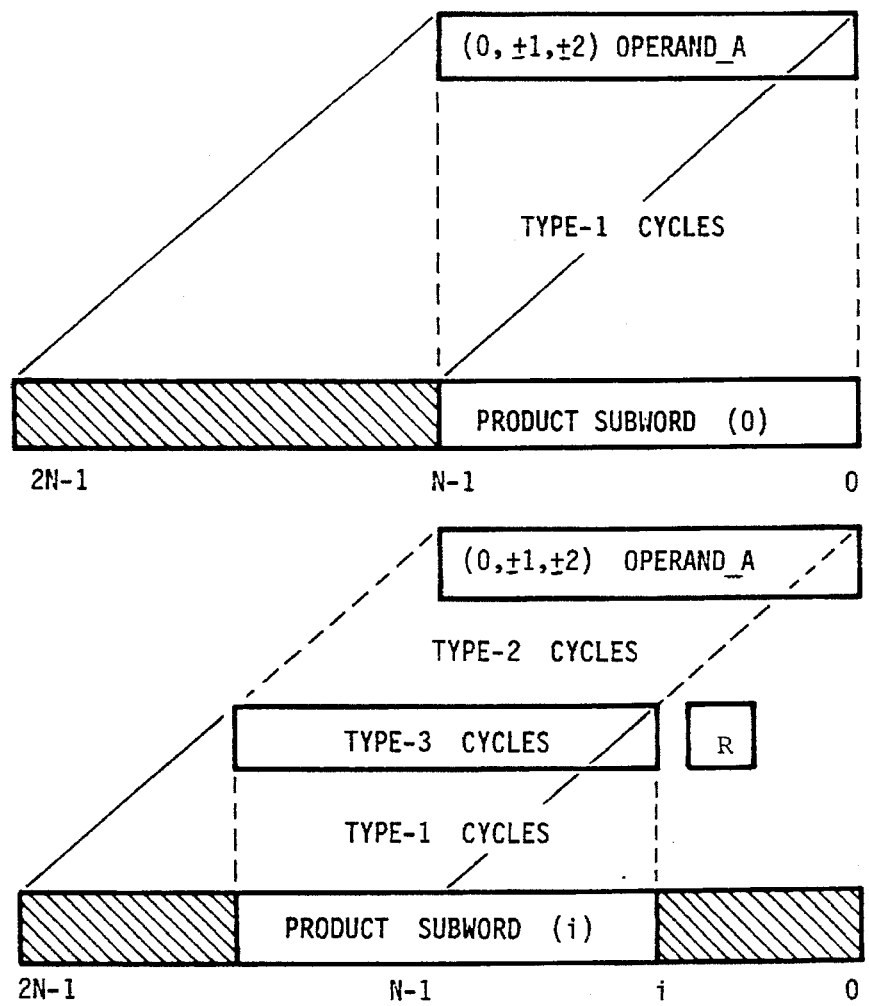
FIG. 2 illustrates the alignment of an operand A with respect to the partial product according to the invention.

As shown in FIG. 1, the multiplier/multiplier-accumulator described in the document referred to hereinbefore, comprises a register file connected to an arithmetic and logic unit (ALU) by means of a first bus (A-bus) and a second bus (B-bus) via a barrel shifter, said arithmetic and logic unit having its output connected to said register by means of a third bus (R-bus), a Booth FSM being connected to the first bus.

In what follows, shift operations are always performed by the barrel shifter, add/subtract operations by the ALU of the datapath as represented on FIG. 1.

A single, datapath cycle involves a parallel register read, a combined shift/ALU operation and a register write-back. A register is read onto the A bus and a second register onto the B bus entering the barrel shifter. The ALU then combines the A bus and the shifter B bus operands according to the operation determined by the Booth FSM. The result is written to the destination register.

The datapath operation of the original method, as defined in the mentioned document, is:

$$\text{product}:=\text{product} \pm LSL \text{ (operand\_A, align)}, \quad (1)$$

where LSL means logical shift left. The alignment amount and ALU operation is determined by the control FSM according to the Booth decoding of operand_B.

Following is a description of the invention generalized multiplier operation. The functionality of the cited document is contained as a special case in the invention method.

Now, for the generation of a selectable N-bit product subword, the partial product itself has to be realigned relative to operand_A:

$$\text{product}:=ASR \text{ (product, align)} \pm \text{operand\_A} \quad (2)$$

where ASR means arithmetical shift right, i.e. shift right with sign extension. Obviously, this operation can be performed by the barrel shifter of the datapath defined in the mentioned document. The alignment amount and ALU operation depend on the Booth decoding of operand_B.

These type (2) cycles are repeated, until the partial product has been shifted by the number of bits corresponding to the desired subword's position. Note that the final type (2) cycle is in fact only for alignment of the partial product and must be distinguished from true type (2). As we will see later, a third type of cycle with multiple purpose will take this place. Then, the invention method proceeds performing type (1) cycles until the early termination condition is met or the maximum number of cycles is reached.

As a side-effect of type (2) operation, overflow can occur if operand_A is an N-bit type. Consequently, to avoid this situation, operand_A must be limited to signed (N−1)-bit, if no modification is done to the barrel shifter of the mentioned document.

Up to this point, the invention method directly generated any N-bit subword of the potentially (2N−1)-bit product. This is equivalent to rounding by truncation. Since for many applications rounding to nearest integer is desired, yet another cycle type is introduced to include the rounding bit R, which is updated every type (2) cycle through the ASR operation, by keeping the last bit dropping out of the barrel shifter. The usual carry bit can be used for storage, but it must not be updated by the ALU then.

$$\text{product}:=ASR(\text{product, align})+\text{operand\_C}+\text{rounding} \quad (3)$$

The type (3) cycle concludes the sequence of type (2) cycles, bringing the partial product to its final position, optionally rounding the product subword to nearest integer and being the right place to add the operand_C as needed for the multiply-accumulate operation.

If the subword is in position 0, which is the special case or the mentioned document, there are neither type (2) nor (3) cycles; it is sufficient to initialize the product register with operand_C.

So, the maximum cycle count is N/2+2, assuming one cycle for initialization of the product register and loading operand_B into the control FSM.

Code C follows, said code having been used for simulating and verifying the satisfactory operation of the method according to the invention.

---

ANNEX

CODE C

```
//
// 2-bit Recoded Booth Multiplication
//
// -> <n-bit> by <(n-1)-bit> giving any desired sub-word of the
//    potentially <(2n-1)-bit> result (fractional arithmetic, DSP..)
// -> Works with early termination
// -> For other word length adjust MAXCYC and ASR accordingly
// -> Rounding is by truncation or optionally to nearest integer
// -> For rounding to nearest integer:
//    update CY = bit (-1) at every ASR, then add/sub CY in the
//    acc cycle (this is when the result format has been reached)
//
#include <stdio.h>
#define MAXCYC 4
int c;        // cycle counter
int round;    // rounding flag
// arithmetical shift right
int asr (p,q)
int p,q;
{
    int sign = p & 0x80;
    if (q > 0) round = (p>>(q-1) & 1);
    p >>= q;
    for (; q>0; q--) { p |= sign; sign >>= 1; }
    return (p);
}
// logical shift left
int lsl (p,q)
```

ANNEX

```
int p,q;
{
    return (p<<q);
}
// multiply
int mult (op_a, op_b, sum, shf)
int, op_a, op_b, sum, shf;
{
    int p = 0;
    int n = 0, sel, s = -1, shf_i, shf_r = shf&1, shf_2 = shf<<1, bo = 0;
    int accum = 1, align = shf_r;
    c = 0;
    if (shf == 0) p = sum; c++; // initialize p (and booth logic)
    shf &= 0xfe;
    while ( ((op_b != 0) || bo == 1) && (n < MAXCYC) ) {
        sel = (op_b & 3)<<1 | bo;
        if (shf > 0) {
            if (s == 0) shf_i = 2; else shf_i = 1;
            switch (sel) {
                case 0 : p = asr(p,shf_i); s = 0; break;
                case 2 : p = asr(p,shf_i) + op_a; s = 0; break;
                case 4 : p = asr(p,1+shf_i) - op_a; s = 1; break;
                case 6 : p = asr(p,shf_i) - op_a; s = 0; break;
                case 1 : p = asr(p,shf_i) + op_a; s = 0; break;
                case 3 : p = asr(p,1+shf_i) + op_a; s = 1; break;
                case 5 : p = asr(p,shf_i) - op_a; s = 0; break;
                case 7 : p = asr(p,shf_i); s = 0; break;
            }
            shf -= 2; c++;
        }
        else { // shf == 0;
            // align p: next two lines will be processed only once
            if (s == 1) { p = asr(p,1-shf_r) + sum + round; c++; } else
            if (s == 0) { p = asr(p,2-shf_r) + sum + round; c++; }
            s = -1; align = 0; accum = 0; // align and accum. done
            switch (sel) {
                case 0 : break;
                case 2 : p = p + lsl(op_a, (2*(n-shf_2)+shf_r)); break;
                case 4 : p = p - lsl(op_a, (2*(n-shf_2)+shf_r+1)); break;
                case 6 : p = p - lsl(op_a, (2* (n-shf_2)+shf_r)); break;
                case 1 : p = p + lsl(op_a, (2* (n-shf_2)+shf_r)); break;
                case 3 : p = p + lsl(op_a, (2*(n-shf_2)+shf_r+1)); break;
                case 5 : p = p - lsl(op_a, (2*(n-shf_2)+shf_r)); break;
                case 7 : break;
            }
            c++;
        }
        bo = (op_b>>1)&1; op_b = op_b>>2; n++;
    }
    shf_i = (s>=0 ? 2-s : 0) + shf;
    if (shf_i > 0) {
        p = asr(p,shf_i-align) + (accum ? sum : 0) + (accum ? round : 0); c++;
    }
    return (p);
}
main ()
{
    int manual = 1;
    int a, b, acc, d, dd, s, ss, cc;
    long cnt = 0, cnt_c = 0, rd;
    printf("Booth's Multiplication Test Suite\n*");
    while (manual) {
        c = 0; rd = 0;
        printf ("\nop_a : "); scanf ("%d", &a);
        printf ("op_b : "); scanf ("%d", &b);
        printf ("accu : "); scanf ("%d" , &acc);
        // shift_amount odd: enter desired shift_amount+2
        printf ("shift : "); scanf ("%d", &s);
        printf ("booth result      : %x\n", mult(a,b,acc,s)&0xff );
        if (s%2 != 0 && s > 2) s -= 2; // adjust shift amount
        printf ("true result, : %lx\n", (long) ((a*b>>s)&0xff)+acc+runc'd);
        if (s > 0) rd = (long) ((a*b)>>(s-1)&1); // rounding flag
        printf ("true result, rounded : %lx\n", (long) ((a*b>>s)&0xff)+acc+rd );
        printf ("cycles       : %d\n", c);
    }
    while (!manual) {
        printf ("accu : "); scanf ("%d", &acc);
        cc = 0;
```

-continued

ANNEX

```
    for (s=0; s<=9; s+=1) {
        if (s !=1) {
            printf ("\n... shift by %d"s);
            for (a=-64; a<63; a++) {
                for (b=-128; b<127; b++) {
                    rd = 0;
                    if (s%2 != 0 && s > 2) ss = s-2; else ss = s;
                    d = (long)mult(a,b,acc,s)&0xff;
                    if (ss > 0) rd = (long)((a*b)>>(ss-1)&1); // rounding flag
                    dd = (long)((((a*b)>>ss)&0xff)+acc+rd)&0xff); // extract LSB
                    if (d-dd != 0) {
                        printf("\nError at %d %d %d %dd",a,b,d,dd); exit ();
                    }
                    cnt_c += c; cnt++;
                    if (c > cc) { cc = c; printf("\tcycles: %d (%d × %d)",c, a, b); }
                }
            }
        }
    } printf ("\n\nCompleted. Cycles/Mult = %f\n\n", (float)cnt_c/(float)cnt);
}
```

I claim:

1. Method for the multiplication/multiplication-accumulation of signed numbers respectively of N bits and N−1 bits, generating a subword of N bits selectable from the result of 2N−1 bits, using a multiplier/multiplier-accumulator comprising a register file connected to an arithmetic and logic unit by means of a first bus and a second bus via a barrel shifter, said arithmetic and logic unit having its output connected to said register by means of a third bus, a Booth FSM being connected to the first bus, said process wherein a partial product is realigned with respect to an operand A in accordance with the following relation:

product:=ASR (product, align)±operand_A in which ASR is an arithmetic alignment to the right, i.e. with sign extension, wherein said cycles of a second type are repeated until the partial product has been shifted by a number of bits corresponding to the desired subword position and wherein cycles of a first type are performed, so as to obtain the relation product:=product±LSL (operand_A, align), in which LSL signifies Logical Shift Left, the alignment quantity and the arithmetic operation being determined by the control FSM in accordance with the Booth decoding of an operand B.

2. Method according to claim 1, wherein the operand A is limited to a signed N−1 bit word.

3. Method according to claim 1 having a supplementary cycle of a third type for including a rounding bit, which is updated at each cycle of the second type by means of the ASR operation and whilst retaining the final dropping out bit of the barrel shifter, a cycle of the third type defined by the following relation:

product:=ASR (product, align)+operand_C+rounding concluding the sequence of cycles of the second type in order to bring the partial product to its final position.

4. Computing device for the multiplication/multiplication-accumulation of signed numbers respectively of N bits and N−1 bits, generating a subword of N bits selectable from the result of 2N−1 bits, said device comprising a multiplier/multiplier-accumulator comprising a register file connected to an arithmetic and logic unit by means of a first bus and a second bus via a barrel shifter, said arithmetic and logic unit having its output connected to said register by means of a third bus, a Booth FSM being connected to the first bus, wherein means are provided for realigning a partial product with respect to an operand A in accordance with the following relation:

product:=ASR (product, align)±operand_A in which ASR is an arithmetic alignment to the right, i.e. with sign extension, means being provided for repeating said cycles of a second type until the partial product has been shifted by a number of bits corresponding to the desired subword position and wherein means are provided for performing cycles of a first type are performed, so as to obtain the relation product:=product±LSL (operand_A, align), in which LSL signifies Logical Shift Left, means for determining the alignment quantity and the arithmetic operation by the control FSM in accordance with the Booth decoding of an operand B.

5. Computing device according to claim 4, wherein the operand A is limited to a signed N−1 bit word.

6. Computing device according to claim 4, wherein a supplementary cycle of a third type is provided for including a rounding bit, which is updated at each cycle of the second type by means of the ASR operation and whilst retaining the final dropping out bit of the barrel shifter, a cycle of the third type defined by the following relation:

product:=ASR (product, align)+operand_C+rounding concluding the sequence of cycles of the second type in order to bring the partial product to its final position.

* * * * *